Oct. 20, 1959 R. V. JUDY 2,909,612
MULTI-EXCHANGE TELEPHONE SYSTEM
Filed July 24, 1956 4 Sheets-Sheet 1
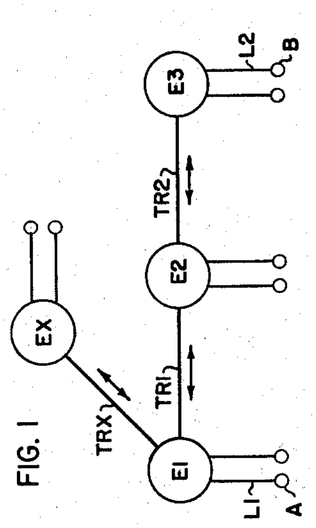
FIG. I
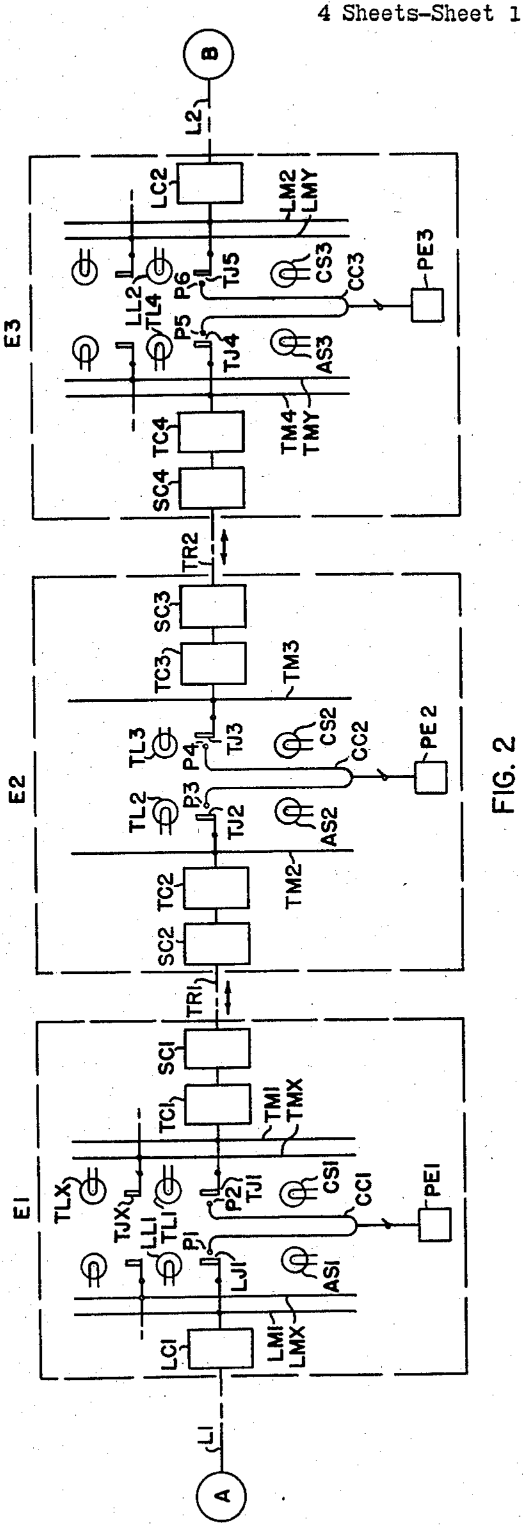
FIG. 2

MULTI-EXCHANGE TELEPHONE SYSTEM

Filed July 24, 1956 4 Sheets-Sheet 2

EXCHANGE E1
LINE CIRCUIT LC1

EXCHANGE E1
LINE CIRCUIT LC1'

Oct. 20, 1959 R. V. JUDY 2,909,612

MULTI-EXCHANGE TELEPHONE SYSTEM

Filed July 24, 1956 4 Sheets-Sheet 3

EXCHANGE EI

1

2,909,612

MULTI-EXCHANGE TELEPHONE SYSTEM

Robert V. Judy, Berwyn, Ill., assignor to International Telephone and Telegraph Corporation, New York, N.Y., a corporation of Maryland Application July 24, 1956, Serial No. 599,742

8 Claims. (Cl. 179—27)

This invention relates to multi-exchange telephone systems of the type including a tandem operator-controlled exchange. The principal object of the invention is to provide an arrangement wherein answered supervision is relayed back through a tandem exchange to the calling exchange, and wherein the operator at the tandem exchange is given consistent recall, answered, and disconnect supervision on local-to-local, local-to-trunk, trunk-to-local, and trunk-to-trunk connections through the exchange.

Heretofore, in known tandem exchange operation, the operator at the tandem exchange on a local-to-local call receives answered supervision from the called line and hookswitch or disconnect supervision from either the calling or called line; on a local-to-trunk call, disconnect and hookswitch supervision is received from the calling line and answered, recall and disconnect supervision over the trunk; on a trunk-to-local call, answered, disconnect, and hookswitch supervision is received from the called line and disconnect and recall supervision over the trunk which also relays answer supervision back over the trunk to the calling exchange, and on a trunk-to-trunk call, answered, recall, and disconnect supervision is received over both trunks. This supervisory arrangement at the tandem exchange slows down the handling of calls due to the operator being continually distracted by single supervision which normally may be overlooked until double supervision appears as in the case of disconnect supervision.

According to the invention, on a trunk-to-trunk call, answered and disconnect supervision is relayed back from the called exchange through a talking conductor of the cord circuit in use at the tandem exchange to the calling exchange. The calling-supervisory device at the tandem exchange, having been disassociated from the called end of the trunk circuit and operatively associated with the answering end of the cord, along with the answering supervisory device. Thereby, both supervisory devices respond in unison, as double supervision to supervisory control exercised over the trunk incoming from the calling exchange.

It has been chosen to disclose the invention as applied to a multi-exchange telephone system, of at least three exchanges of the usual manual plug and jack type, serving perhaps 200 to 300 local lines and trunks.

The above-mentioned and other features and objects of this invention and the manner of attaining them will become more apparent and the invention itself will be best understood, by reference to the following description of an embodiment of the invention taken in conjunction with the accompanying drawings comprising Figs. 1 to 6, wherein:

Fig. 1 shows the paths taken by the trunk lines interconnecting exchanges of the system;

Fig. 2 is a switching diagram of a telephone system of Fig. 1 showing the supervisory apparatus in exchanges E1 to E3 according to the invention.

2

I. *The System—Fig. 1*

Figure 3:
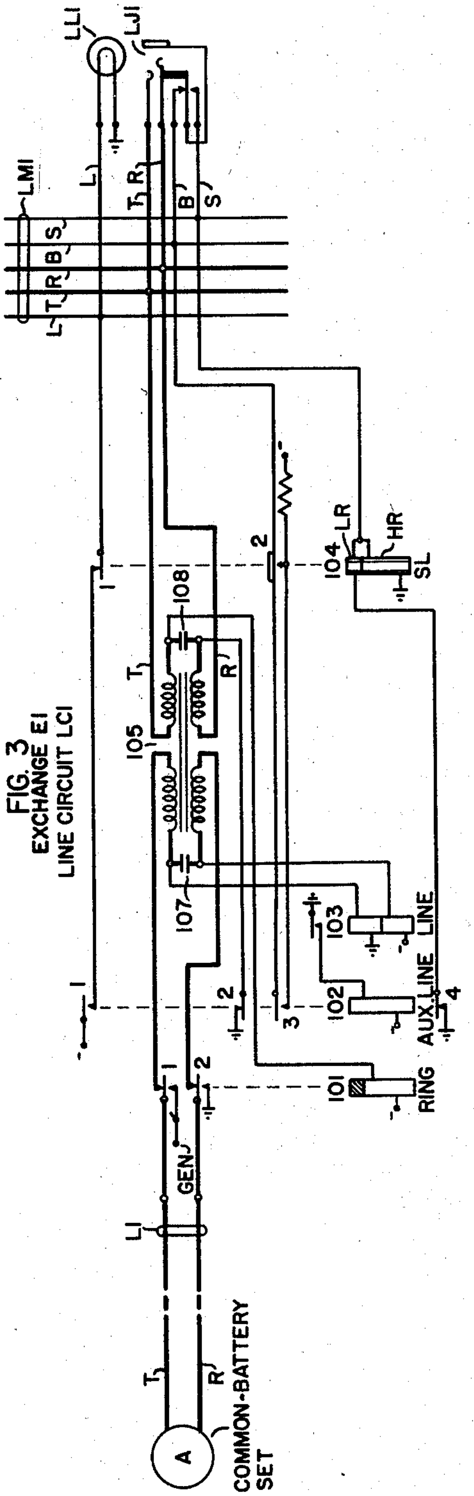
Figs. 3 to 6 are circuit diagrams of the apparatus in exchange E1 incorporated in the system of Figs. 1 and 2.

As shown in Fig. 1, the multi-exchange telephone system comprises four similar exchanges, E1 to E3, and EX.

As indicated in Fig. 1, the exchanges are interconnected by groups of two-way trunks, such as trunks TR1, TR2, and TRX. Similarly, it is indicated that each exchange includes terminating local lines, such as lines L1 and L2 of exchanges E1 and E3 respectively.

The arrangement illustrated in Fig. 1 is further intended to indicate that an operator at exchange E1 can extend a connection from station A of line L1 to a station B of line L2 of exchange E3 through the tandem exchange E2, while an operator at exchange EX may also extend a connection to exchange E3 through exchanges E1 and E2.

II. *Switching diagram—Fig. 2*

Referring now to Fig. 2 of the drawings, the apparatus of a multi-exchange telephone system using the principles of the invention will be described.

Fig. 2 shows the apparatus in exchanges E1 to E3, which are connected by two-way trunks, such as TR1 and TR2 for extending a call from station A of line L1 to station B of line L2.

The apparatus of the exchanges E1 to E3 may be similar, each exchange being of the manual plug and jack type having cord circuits for interconnecting local lines and trunks. For simplicity, generally only the apparatus necessary to complete the interexchange call is shown.

The equipment in exchange E1 includes local-calling line L1 and its associated line circuit LC1, line lamp LL1, and line jack LJ1, illustrative of the line jacks through which the local lines of exchange E1 are reached; trunk jack TJ1, illustrates the trunk jacks through which the trunks of exchange E2 are reached; cord circuit CC1, having plugs P1 and P2, for extending a connection between jacks, its associated position equipment PE1; and two-way trunk TR1, trunk circuit TC1, trunk lamp TL1, and signal circuit SC1, associated with trunk jack TJ1.

As indicated in Fig. 2, the line jacks are shown multipled to other positions (not shown) over line multiples LM1 and LMX at exchange E1, and LM2 and LMY at exchange E3. The trunk jacks of exchanges E1 to E3 are similarly multiplied to other positions over trunk multiples TM1 to TM4, TMX, and TMY. Trunk jack TJX and trunk lamp TLX are associated with trunk TRX (Fig. 1) for extending a connection to or from exchange EX.

Cord circuit CC1, illustrative of the cord circuits connected to position equipment PE1, includes the usual supervisory lamps AS1 and CS1.

The equipment in tandem exchange E2 includes usual local lines (not shown); signal circuits SC2 and SC3; trunk circuits TC2 and TC3; trunk jacks TJ2 and TJ3 and their associated trunk lamps TL2 and TL3; cord circuit CC2 including supervisory lamps AS2 and CS2; and plugs P3 and P4 for extending a connection between the jack associated trunks TR1 and TR2; and position equipment PE2.

The equipment in exchange E3 being similar to that in exchange E1, includes signal circuit SC4; trunk circuit TC4; trunk jack TJ4 and its associated trunk lamp TL4; local-called line L2 and its associated line circuit LC2, line lamp LL2, and line jack LJ2; cord circuit CC3 including supervisory lamps AS3 and CS3, and plugs P5 and P6 for extending a connection between the jack associated trunk TR2 and local line L2; and position equipment PE3.

Figure 4:
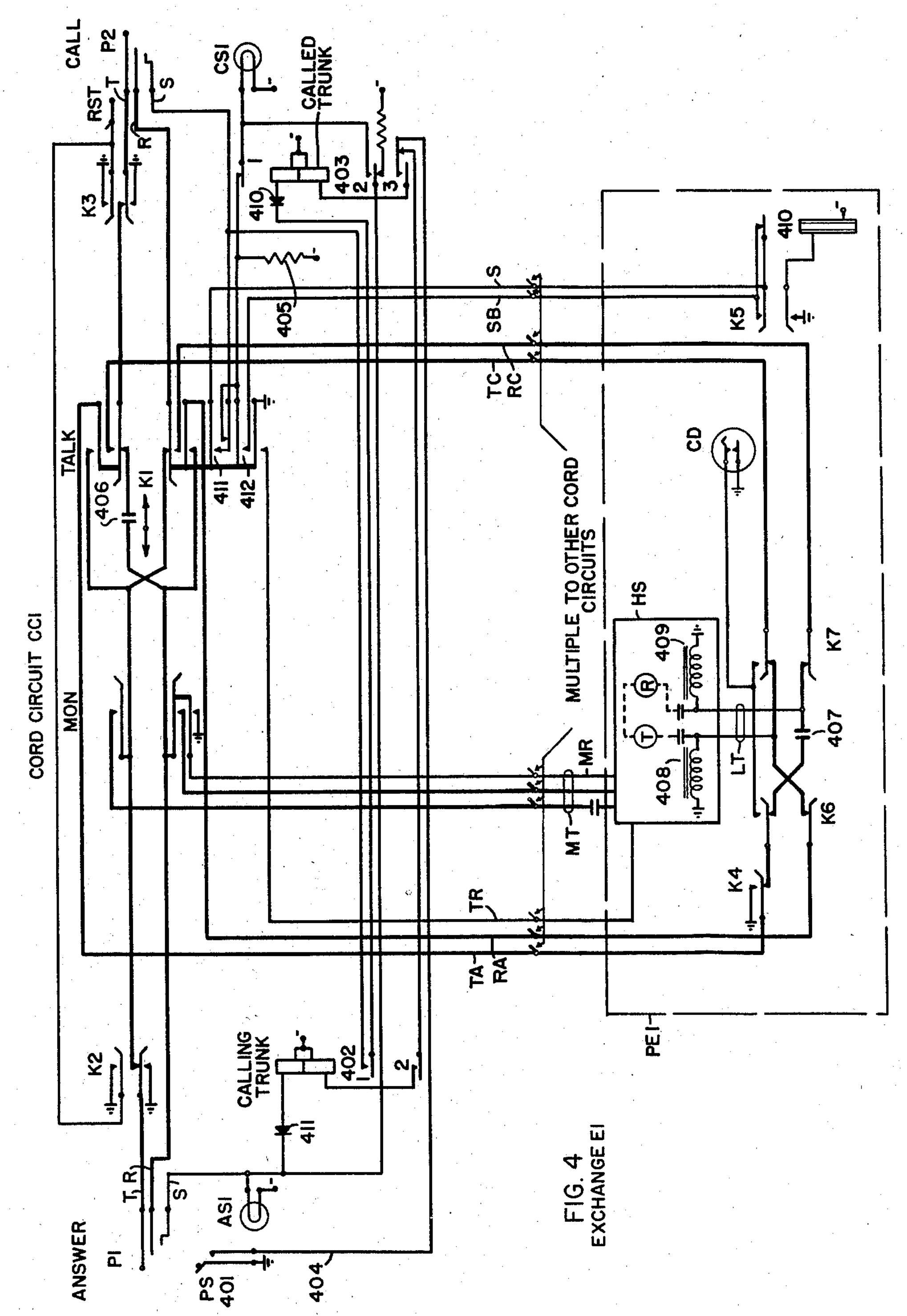
Figure 5:
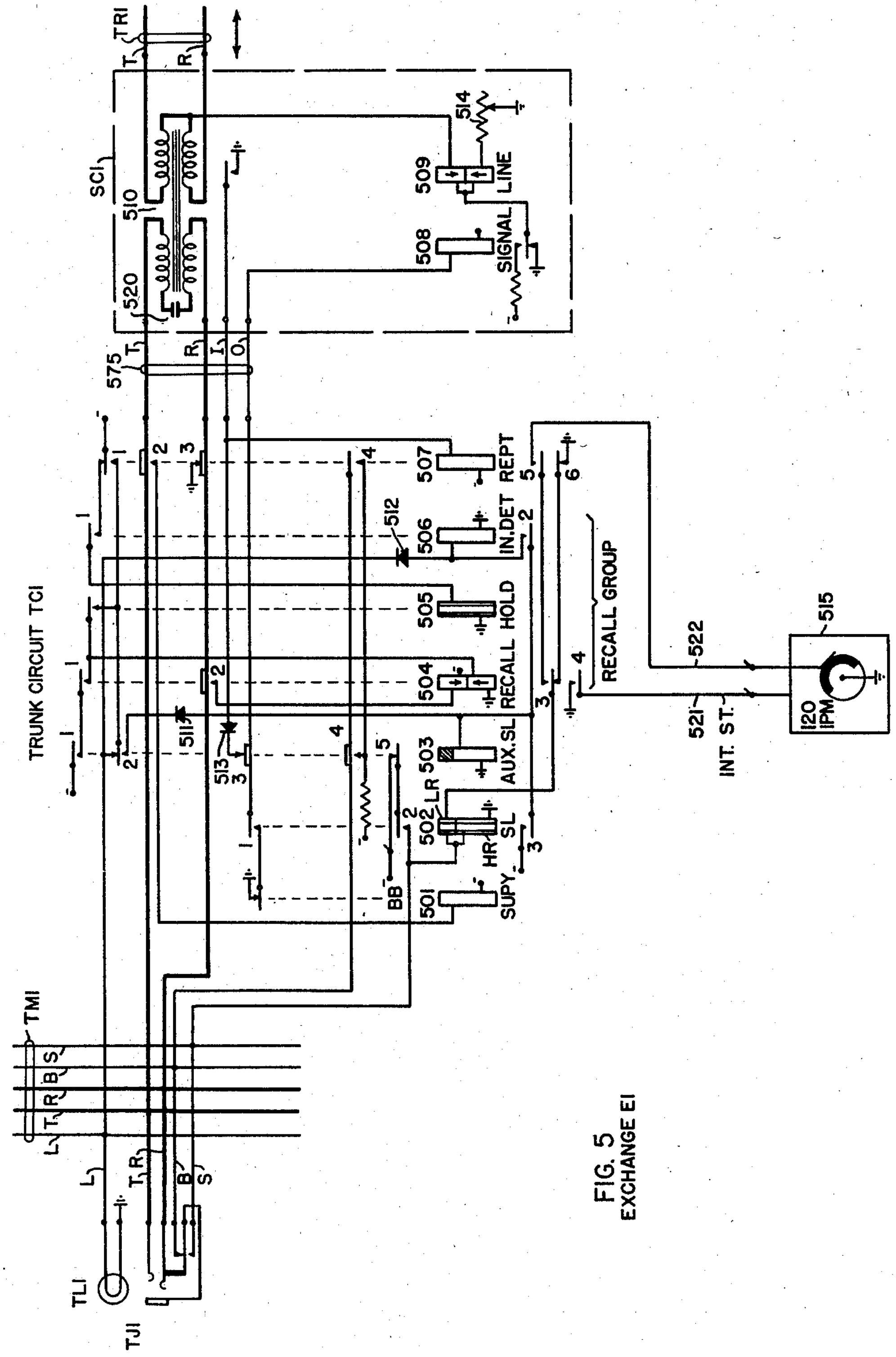

III. *Detailed Description—Figs. 3 to 5*

Referring to Figs. 3 to 5, which show in circuit detail the apparatus in exchange E1 of Fig. 2 including the line circuit LC1 (Fig. 3), cord circuit CC1 and position equipment PE1 (Fig. 4), trunk circuit TC1 and signal circuit SC1 (Fig. 5). As previously stated, line circuit LC2 of exchange E3, of Fig. 2, is similar to line circuit LC1, as are cord circuits CC2 and CC3 and position equipments PE2 and PE3 similar to cord circuit CC1 and position equipment PE1 and trunk circuits TC2 to TC4 and signal circuits SC2 to SC4 similar to trunk circuit TC1 and signal circuit SC1.

IIIA. *Local-to-local call*

The subscriber at A of line L1, desiring to make a local call, removes his handset (not shown) which results in the usual operation of line relay 103 over the bridge which includes line L1, the common-battery telephone set at station A, back contacts 1 and 2 of ringing relay 101, and through the left-hand windings of repeating coil 105, which has usual by-pass condensers 107 and 108. Line relay 103 operates auxiliary-line relay 102.

At its contacts 2, auxiliary-line relay 102 removes ground potential from talking conductor R associated with the right-hand windings of repeating coil 105; at its contacts 4, it removes ground from the upper low-resistance winding LR of sleeve relay 104; at its contacts 1, it lights line lamp LL1 through back contacts 1 of sleeve relay 104; and at its contacts 3, it applies the usual tip-busy-test battery to busy-test wire B, which is normally multipled to other positions by multiple LM1, which also includes lamp wire L, talking conductors T, R, and sleeve conductor S.

The operator upon seeing lamp LL1 lighted inserts answering plug P1, of an idle cord circuit CC1 into line jack LJ1 thereby disconnecting wire B from the sleeve portion of line jack LJ1 and connecting sleeve conductor S to complete an operate circuit for sleeve relay 104. Plug seat switch 401 is operated upon the removal of the plug P1 from its plug seat to ground hold wire 404.

The operate circuit for sleeve relay 104 is from resistance battery at back contacts 2 of called-trunk relay 403 (Fig. 4), associated sleeve conductors S, through the lower high-resistance winding HR of sleeve relay 104 to ground.

Answering-supervisory lamp AS1 of cord circuit CC1, does not operate over this circuit by virtue of the high-resistance path being operable only over a low-resistance path.

At its contacts 2, sleeve relay 104 further applies battery potential to conductor B, and at its contacts 1, it extinguishes line lamp LL1.

Cord circuit CC1 includes key K1, which may be of the usual three-position telephone-type key having an illustrated normal position, while movement to the right actuates the talking portion of the key, and movement to the left actuates the monitoring portion to enable the operator to check the status of a call by extending the talking conductors T and R via monitoring taps MT to the operator's headset HS, and grounding monitoring-relay wire MR in the usual manner.

Cord circuit CC1 also includes ringing keys K2 and K3, generally constructed as a single key, similar to K1, for ringing forward or back over an established connection.

Position equipment PE1 includes recall keys K4 and K5 which may be a single key similar to K1 as is cord-splitting keys K6 and K7.

With key K1 in talking position the conventional manner of splitting the cord is shown having the answering conductors extended via conductors TA and RA to key K6 while having the calling conductors extended as TC and RC to key K7. The calling sleeve conductor S is split as conductors S and SB and extended to key K5, which is operated on forward recall as will be described.

The position equipment is provided with a calling device CD for use when a connection is extended to a dial exchange (not shown). With cord-splitting key K6 or K7 operated the calling device CD is connected onto the tip-answer conductor TA or tip-call conductor TC for operating a dialing relay (not shown).

The operator's headset HS includes the usual transmitter T, receiver R, an induction coil and monitoring relay (not shown), and retard coils 408 and 409. Retard coil 408 having ground potential connected therewith, is associated with the receiver R for the conventional tip-busy test, when the tip of calling plug P2 is touched to a sleeve of a jack under test, via talking key K1, conductor TC, and key K7.

Retard coil 409 supplies ground potential to conductor R associated with calling plug P2 to restore recall relay 504 as will be described. Blocking condenser 407 prevents the ground at 409 from appearing on the tip conductor T, associated with the answering plug P1.

The operator actuates key K1 to its talking position thereby completing a local talking path via conductors TA and RA, keys K4 and K6, listening taps LT to her headset HS. Key K1 also grounds transmitter wire TR to complete the local talking circuit.

Neither calling-trunk relay 402 nor called-trunk relay 403 is operated on a local-to-local call.

With key K1 operated into its talk position, the operator may converse with the subscriber at A to receive the called number.

The operator, after the usual tip-busy test, inserts calling plug P2 into the jack of the called line (if idle) and rings the called party.

Since all line circuits may be similar, the completion of the connection may be described on the assumption that some other local line is calling line L1. In this event, the insertion of calling plug P2 of cord circuit CC1 into jack LJ1 disconnects the sleeve of the jack from the busy wire B and transfers it to sleeve relay 104, which operates from battery, resistor 405 (Fig. 4), contacts 411 and 412 of key K1, connected sleeve conductors S, through the windings LR and HR of relay 104 to ground.

The low-resistance winding LR of relay 104 being connected to ground at contacts 4 of auxiliary-line relay 102 lights calling-supervisory lamp CS1, the operate circuit being through contacts 1 of called-trunk relay 403.

At its contacts 1, sleeve relay 104 opens the operate circuit for line lamp LL1, and at its contacts 2, it applies battery to wire B of line multiple LM1.

The operator, upon seeing lamp CS1 lighted, operates ringing key K3 in the usual manner which applies ground to ring-start terminal RST to start the ringing generator and grounds the outgoing tip conductor T to operate ringing relay 101 (Fig. 3) through the upper left-hand winding of repeating coil 105.

At its contacts, ringing relay 101 completes the ringing circuit for the called subscriber including ringing-generator terminal GEN, line L1, the signalling device (not shown) at the subscriber's telephone to ground.

When the called subscriber answers, line relay 103 and auxiliary-line relay 102 operate is described.

At its contacts 4, auxiliary-line relay 102 extinguishes lamp CS1 by opening its low-resistance operate path, sleeve relay 104 being held operated through its lower high-resistance winding HR.

With key K1 in its normal position the calling line is extended to the called line, one connecting conductor including coupling condenser 406.

A subscriber, desiring to recall the operator, may intermittently actuate his hook switch (not shown) which results in the usual intermittent operation of the line relay to give the operator hook-switch supervision by flashing the supervisory lamp associated with connect end of the cord circuit.

After completing their conversation, the subscribers replace their handsets to give the operator disconnect supervision.

The replacement of the handset at station A, results in the usual restoration of relays 103 and 102.

At its contacts 1, relay 102 further opens the circuit for line lamp LL1; at its contacts 2, it places ground on the ring conductor R associated with the left-hand windings of repeating coil 105; at its contacts 3, it places busy test battery under control of sleeve relay 104; and at its contacts 4, it completes the low-resistance operate circuit for the supervisory lamp associated with the connected end of the cord circuit giving the operator disconnect supervision.

The jack associated line circuit similarly responds on disconnect to light the other supervisory lamp.

The operator, upon seeing both supervisory lamps lighted, pulls down the connection thereby restoring the apparatus to normal.

IIIB. *Local-to-trunk call*

The subscriber at A of line L1, desiring to make a trunk call proceeds as for a local-to-local call giving the operator the number of the called party in the distance exchange.

The operator, after completing the tip-busy test, inserts her calling plug P2 into an idle trunk jack TJ1. Trunk jack TJ1, similar to line jack LJ1 of Fig. 3, disconnects busy wire B of trunk multiple TM1 and connects sleeve wire S thereof to the sleeve portion of the jack. Trunk multiple TM1 also includes lamp wire L and conductors T and R.

The insertion of plug P2 into jack TJ1 results in the operation of sleeve relay 502, of trunk circuit TC1, from battery potential on the sleeve of the calling plug P2, conductor S, through the windings of 502 to ground.

Supervisory lamp CS1 is not lighted over the low-resistance path through the upper winding LR of 502 because repeating relay 507 operates to open the circuit as will be described.

At its contacts 1, sleeve relay 502 grounds outgoing wire 0, of conductor group 575, to operate signal relay 508 of signal circuit SC1, rectifier 513 prevents repeating relay 507 from operating at this time; at its contacts 2, it applies negative-potential booster battery BB through contacts 5 of 503 to the sleeve conductor S being effective only on a trunk-to-trunk call; and at its contacts 3, it completes an operate path for slow-operate auxiliary-sleeve relay 503.

At its contacts 1, auxiliary-sleeve relay 503 extends battery potential to contacts 1 of relay 504; at its contacts 2, it opens the operate circuit for trunk lamp TL1 and incoming-detect relay 506 and prepares its auxiliary-holding circuit through rectifier 511; at its contacts 3, it disconnects incoming wire I from outgoing wire O of group 575; at its contacts 4, it applies battery to busy wire B of trunk multiple TM1; and at its contacts 5, it removes booster battery from sleeve wire S.

As described in connection with Fig. 2, signal circuit SC1 is connected via a two-way trunk, such as trunk TR1, to a similar signal circuit SC2 in exchange E2. The trunk circuit TC2, in exchange E2 is automatically seized and trunk lamp TL2 is lighted when trunk circuit TC1 is taken for use.

Conductor group 575 extends the connection from trunk circuit TC1 to its associated signal circuit SC1, including talking conductors T and R, and control wires I and O.

The talking conductors T and R, of signal circuit SC1, are inductively coupled to the talking conductors of trunk TR1 through the windings of repeating coil 510, which has a usual by-pass condenser 520.

At its front contacts, relay 508 upon operating applies resistance battery to the windings of line relay 509.

Line relay 509 has two windings differentially wound and so connected electrically that either of its windings alone may operate it but when both windings are energized the relay will restore to or remain at normal. The lower winding of 509 being connected to ground through the usual balancing resistor 514, the upper winding being connected to trunk TR1 through the right-hand winding of repeating coil 510.

When signalling forward over trunk TR1, ground is normally applied thereto from back contacts of 508 through the upper winding of line relay 509, upon seizure thereof battery is substituted, and upon disconnect ground is reapplied, local line relay 509 having been operated during seizure is restored. Supervision back over the trunk ground is normally applied, the same grounded condition being for unanswered and disconnected supervision, on an answered supervisory condition battery is substituted to operate local line relay 509, and when ground is again applied as disconnect supervision relay 509 is restored.

Local line relay 509 of SC1 does not immediately operate as both its windings are energized. Answered supervision (battery) received back over the trunk to its upper winding from the distant signal circuit allows relay 509 to operate.

In the disclosed arrangement the distant signal circuit and trunk respond automatically to give the local calling operator answered supervision and lights the distant trunk lamp.

At its contacts, line relay 509 grounds incoming wire I of conductor group 575 to operate repeating relay 507.

At its front contacts 1, repeating relay 507 completes the auxiliary-holding path for relay 503; at its contacts 2, it prepares an operate circuit for supervisory relay 501; at its contacts 3, it removes ground from talking conductor R; at its contacts 4, it further applies resistance battery to wire B; at its contacts 5, it prepares a flashing-recall arrangement; and at its contacts 6, it removes ground from the low resistance winding LR of sleeve relay 502 to give the operator answered supervision (lamp CS1 unlighted).

The operation of the recall relays 504 to 506 and the operation of supervisory relay 501 will be hereinafter described.

Unanswered supervision is relayed back to the calling operator by returning trunk TR1 to its normal (or grounded) condition thereby restoring local-line relay 509 by energizing its upper winding.

Upon restoring relay 509 restores repeating relay 507 which at its contacts 6 completes the low-resistance operate circuit for lamp CS1 to give unanswered supervision. Signal relay 508 is held operated under control of supervisory relay 501.

The called party upon answering, restores trunk TR1 to its seized condition reoperating relays 509 and 507 to extinguish lamp CS1 to give answered supervision.

When the called party disconnects, trunk TR1 is returned to normal which results in lamp CS1 being lighted, answering-supervisory lamp AS1 being lighted when the calling party hangs up. The operator upon seeing double disconnect pulls down the connection returning the circuit to its illustrated normal condition.

IIIC. *Trunk-to-local call*

On an incoming trunk call the distant (or preceding) trunk circuit and signal circuit operate as described on a local-to-trunk call to operate the line relay of the signal circuit associated with the incoming trunk.

Consider an incoming-trunk call over trunk TR1, line relay 509 of SC1 operates from battery applied to the trunk by the signal relay of the distant signal circuit, through the right-hand windings of repeating coil 510, upper winding of relay 509 to ground at the back contacts of signal relay 508.

Upon operating, line relay 509 grounds incoming wire I of conductor group 575 to operate repeating relay 507 and signal relay 508 via rectifier 513, normally closed contacts 3 of relay 503 and outgoing wire O.

Upon operating, signal relay 508 holds line relay 509 operated through its lower winding, and applies battery to the trunk to give answering supervision back.

At its front contacts 1, repeating relay 507 lights trunk lamp TL1 via back contacts 2 of relay 503 and operates incoming detect relay 506 in parallel; at its contacts 2, it prepares an operate circuit for supervisory relay 501, at its contacts 3, it ungrounds conductor R; at its contacts 4, it applies battery potential to wire B of trunk multiple TM1; and at its contacts 6 it removes ground from the upper winding of sleeve relay 501.

At its contacts 1, incoming-detect relay 506 prepares an operate circuit for hold relay 505 upon the restoration of relay 507, and at its contacts 2, it prepares its holding circuit under control of sleeve relay 502.

Rectifier 512 being provided in the operate circuit of incoming-detect relay 506 to permit the orderly extinguishing of trunk lamp TL1.

The operator upon seeing trunk lamp TL1 lighted, inserts her answering plug P1, of cord circuit CC1, into jack TJ1 which results in the operation of sleeve relay 502. Plug seat switch 401 operates as described to ground wire 404.

At its contacts 1, sleeve relay 502 completes a holding circuit for a signal relay 508 under control of supervisory relay 501; at its contacts 2, booster battery BB is applied to the sleeve conductor via contacts 5 of relay 503 to operate calling-trunk relay 402 associated with the answer end of cord circuit CC1; and at its contacts 3, it operates auxiliary-sleeve relay 503 and completes the holding circuit for the incoming-detect relay 506.

Calling trunk relay 402 has been provided with rectifier 411 in its operate circuit to prevent the ground normally associated with the sleeve conductor from prematurely operating it.

At its contacts 1, calling-trunk relay 402 prepares an operate circuit for called-trunk relay 403; and at its contacts 2, locks itself operated to wire 404 via make-before-break contact 3 of called-trunk relay 403.

Answering-supervisory lamp AS1 is not lighted having its low-resistance ground path opened at contacts 6 of repeating relay 506.

Upon operating, auxiliary-sleeve relay 503 at its contacts 2 extinguishes trunk lamp TL1; at its contacts 3, it opens the operate circuit for signal relay 508 being held operated under control of supervisory relay 501; and at its contacts 5, it disconnects booster battery BB from sleeve conductor S.

The operator may actuate key K1 into its talking position and may then be informed by the originating operator of the number of the called party, thereupon after the usual tip-busy test, inserts her calling plug P2 into the called line jack, such as LJ1, to operate sleeve relay 104.

The operate circuit for sleeve relay 104 is from battery through resistance 405 of CC1, contacts 411 and 412 of key K1, the connected sleeve conductor S through its windings to ground.

Calling superivsory lamp CS1 is lighted over the low-resistance path through the upper winding of sleeve relay 104 to ground at contacts 4 of auxiliary-line relay 102. Call trunk relay 403 is not operated.

When the operator inserts her called plug P2 into line jack LJ1 unanswered supervision is relayed back to the originating operator. Ground at contacts 2, of auxiliary-line relay 102, is extended back to operate supervisory relay 501 via conductor R, the right-hand windings of repeating coil 105, over a talking conductor of cord circuit CC1, conductor T of trunk circuit TC1, and contacts 2 of repeating relay 507.

At its contacts, supervisory relay 507 restores signal relay 508, local-line relay 509 remains operated from battery incoming over trunk TR1, to give unanswered supervision.

The operator rings the called party in the manner as described in connection with a local-to-local call.

When the called party answers, line relay 103 and auxiliary-line relay 102 respond thereby removing ground potential from conductor R, thereby restoring supervisory relay 501 to give answered supervision back to the called operator. Local calling-supervisory lamp CS1 being extinguished at contacts 4 of relay 102.

Supervisory relay 501 reoperates signal relay 508 to apply battery potential back over the trunk.

Upon the completion of the conversation the called party upon replacing his handset restores relays 103 and 102 to give the terminating operator local disconnect supervision (lamp CS1 lighted), and also extends back to the originating operator disconnect supervision in a manner as described for unanswered supervision.

IIID. *Trunk-to-trunk-call*

On a trunk-to-trunk call, tandem operation, the operation of the calling trunk being similar as on a trunk-to-local call, where the trunk lamp is lighted to indicate to the operator that a call is waiting and upon plugging in operates calling-trunk relay 402 which is lock operated under control of called-trunk relay 403. The operator after having received the number of the called party may restore her talking key K1 to its normal position and insert calling plug P2 into trunk jack, such as TJ1 associated with the desired called trunk circuit TC1.

Sleeve relay 502 operates as heretofore explained applying booster battery BB through the back contacts 5 of auxiliary-sleeve relay 503 over the called sleeve connection, contacts 1 of operated calling-trunk relay 402, rectifier 410 through the winding of relay 403 to battery.

At its contacts 1, called-trunk relay 403 disconnects calling supervisory lamp CS1 from the called sleeve; at its contacts 2, it disconnects resistance battery from the calling sleeve associated with the answering end of the cord and connects the called supervisory lamp CS1 in parallel with answering-supervisory lamp AS1 under control of the incoming trunk; and at its make-before-break contacts 3, it opens the holding circuit for calling-trunk relay 402 and locks itself operated to ground at plug seat switch 401 over wire 404.

Rectifier 410 in the operate circuit for relay 403 being similar to rectifier 411 in the operate circuit for relay 402.

As explained, unanswered supervision is relayed back from the called line to the originating operator. During the unanswered supervision period, repeating relay 507 of the called trunk restores to ground conductor R at its contacts 3. The ground on conductor R is extended, through the cord circuit to appear on the tip conductor T in the calling trunk circuit to operate its supervisory relay. Unanswered and disconnect supervision similarly pass back through the cord circuit to the calling trunk which relays it back to the originating exchange.

The originating operator upon pulling down the connection results in the reappearance of ground on the connected trunk to relay disconnect supervision forward. In the tandem exchange the calling trunk responds thereby completing an operate circuit for the supervisory lamps AS1 and CS1, which are connected in parallel.

The operator at the tandem exchange upon seeing the supervisory lamps lighted pulls down her connection resulting in disconnect supervision being forward to the called exchange.

IV. *Recall*

The position equipment PE1 to PE3 of Fig. 2 are provided with recall keys (not shown) to enable the operator, for example, at E2, to recall the operator at E1 or to recall the operator at E3.

The position equipment PE1, associated with cord circuit CC1 of Fig. 4, is provided with a key K4 for recall signalling back over a calling trunk to give the originating operator recall supervision and key K5 for recall signalling forward over the called trunk to give the distant operator recall supervision.

An operator at exchange E2, having a cord circuit similar to CC1 in use, desiring to recall back actuates key K4 which opens wire TA and extends ground back over wire TA, through key K1 (which is operated during recall), to the answering tip conductor T to operate the supervisory relay in the jack associated calling trunk circuit TC2 to restore its signal relay thereby applying a normal (ground) condition to the calling trunk TR1, which results in lighting the calling supervisory lamp at the originating exchange E1. Recall key K4 may be intermittedly operated to give a flashing lamp at exchange E1. Upon the release of the recall key K4 the supervisory relay restores which results in returning the trunk TR1 to its talking condition.

If the operator at E2 desires to recall forward to exchange E3, she operates key K1 into its talking position and momentarily operates key K5. Key K5 operates slow-release relay 410 and maintains the normally connected sleeve wires SP and S connected as long as the key is operated. When key K5 is released, the connection is momentarily opened until relay 410 can restore to permit the jack associated sleeve relay such as 502 of trunk TC1 to restore. Upon restoring, relay 502 at its contacts 1 opens the operate circuit for signal relay 508 thereby returning the outgoing trunk to its normal or grounded condition.

The operation of trunk circuit TC4 and signal circuit SC4 of exchange E3 of Fig. 3 will be described with reference to trunk circuit TC1 and signal circuit SC1 of Fig. 4.

A normal or ground condition on the incoming trunk results in the momentary restoration of line relay 509 and repeating relay 507.

With relays 502, 503, and 506 operated as described, upon restoring, relay 507 at its back contacts 1 operates hold relay 505 through contacts of operated relay 506.

At its contacts, slow-release hold relay 505 prepares an operate circuit for recall relay 504 upon the reoperation of repeating relay 507.

The grounded condition on the incoming trunk remains until the slow-release relay 410 associated with recall key K5 releases, whereupon battery is reapplied over the trunk to allow line relay 509 and repeating relay 507 to reoperate.

Upon reoperating, relay 507 at its front contacts 1 operates recall relay 504.

At its contacts 1, recall relay 504 locks itself operated to battery at contacts 1 of auxiliary-sleeve relay 503 independent of its operate circuit under control of its hold relay 505 which restores shortly having its operate circuit opened at back contacts 1 of relay 507. At its contacts 2, relay 504 prepares its release circuit; at its contacts 4, it grounds interrupter start wire 521; and at its back contacts 3, it disconnects the low-resistance operate path for the calling supervisory lamp of the cord circuit in use; and at its front contacts 3, applies a low-resistance 120IPM ground path through contacts 5 of relay 507 to give a flashing condition to the answering supervisory lamp.

The operator at exchange E3 upon seeing the flashing supervisory lamp actuates her key, such as K1 of cord circuit CC1, into its talking position to converse with the calling operator. Upon actuating her key K1 to its talk position, ground potential is applied from retard coil 409 of the operator's headset HS, listening taps LT, lower portion of key K7, conductor RC, key K1, conductor R, contacts 2 of operated recall relay 504, through its winding to battery.

Recall relay 504 being a differential type relay similar to line relay 509, restores. Upon restoring relay 504 opens its holding circuit at its contacts 1, and at its contacts 2, it opens its knock-down circuit; at its contacts 4, it ungrounds interrupter start wire 521; and at its front contacts 3, it opens the interrupted ground path from interrupter 515.

Figure 6:
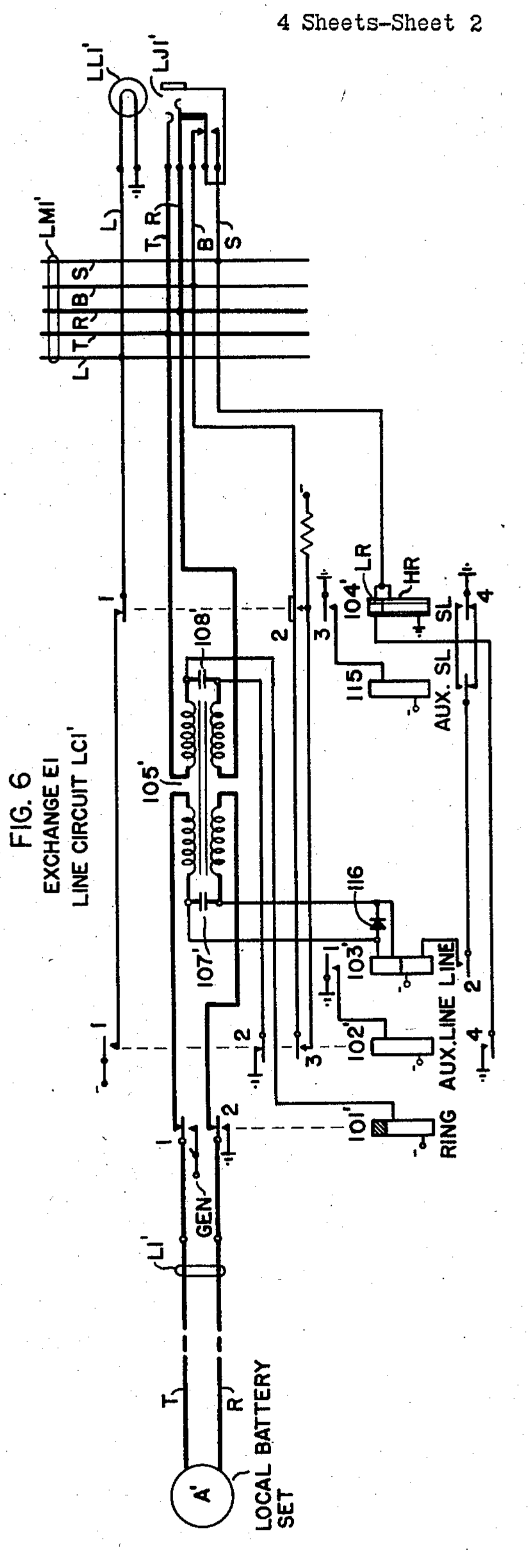

V. *Line circuit LC1′—Fig. 6*

The exchanges E1 to E3 of Fig. 2 may also serve magneto lines and trunks, the operation of a magneto line circuit and a magneto trunk being similar.

If the subscriber at station A′, of line L1′, desires to make a call, he extends a low frequency signal out over line L1′, by operating the usual hand generator of his local-battery telephone set, through the left-hand windings of repeating coil 105′, having the usual by-pass condensers 107′ and 108′, which results in the usual operation of line relay 103′ having a rectifier 116 connected across its upper winding terminals to give it a steady-state operate condition.

At its contacts 2, line relay 103′ locks itself operated under control of relays 104′ and 115, and at its contacts 1, it operates auxiliary-line relay 102′.

At its contacts 3, relay 102′ applies the usual resistance battery to busy wire B of line multiple LM1′, which includes conductors L, T, R, and S, and at its contacts 1 lights line lamp LL1′.

The operator upon seeing lamp LL1′ lighted inserts the answer plug of an idle cord circuit into line jack LJ1′, to complete an operate circuit for sleeve relay 104′.

At its contacts 1, sleeve relay 104′ extinguishes line lamp LL1′, at its contacts 2, it further applies battery to wire B, at its contacts 3, it operates auxiliary-sleeve relay 115, and at its back contacts 4, it restores line relay 103′ followed by the restoration of auxiliary-line relay 102′.

Upon completing a conversation the subscriber at A1 again applies a low freqency current to line L1′ to reoperate line relay 103′ and auxiliary-line relay 102′. Relay 103′ being held operated to ground at front contacts 4 of sleeve relay 104′.

Upon operating, relay 102′ at its contacts 4 applies ground through the upper low-resistance winding of sleeve relay 104′ to give the operator local disconnect supervision.

If the called party is A′, an operator plugs her calling plug into line jack LJ1′ thereby operating sleeve relay 104′ and auxiliary-sleeve relay 115, to complete a holding circuit for line relay 103′ to ground at contacts 4 of 104′. The operator may then ring the party in the manner described by operating ringing relay 101′ to complete a ringing circuit at its contacts.

Line relay 103′ does not respond when the called party answers, but is operated when the called party hangs up and rings down thereby locking itself operated under control of sleeve relay 104′. Upon operating, auxiliary-line relay 102′ at its contacts 4 gives local disconnect supervision, and at its contacts 2, applies ground to the ring conductor R which results in disconnect supervision to appear at the originating exchange if the call was an interexchange call.

The operator upon seeing the called supervisory lamp lighted pulls down the connection thereby restoring sleeve relay 104′ which restores line relay 103′ before slow-release auxiliary-sleeve relay 115 restores.

While I have described above the principles of my invention in connection with specific apparatus, it is to be clearly understood that this description is made only by way of example and not as a limitation to the scope of my invention.

I claim:

1. In a multi-exchange telephone system including a group of exchanges interconnected by trunks, with each exchange including a switchboard terminating local lines and inter-exchange trunks and having switching equipment for interconnecting such local lines and trunks to establish intra-exchange and inter-exchange connections, the switchboard of at least one exchange being operator-controlled and having a group of cord circuits, with each cord circuit having an answering end and a calling end, each such end including at least one talking conductor and a sleeve conductor which are connectable to corresponding conductors of either a local line or a trunk, each cord circuit including an answering and a calling supervisory device associated with their respectively corresponding ends of the cord circuit, each supervisory device being controllable over its associated sleeve conductor, means controlled over any local line from a station thereon, and means controlled over any said trunk terminating at the said operator-controlled exchange, for imposing alternative supervisory signal conditions separately on the sleeve conductor and on a talking conductor of either end of any cord circuit that is connected therewith, the sleeve-conductor supervisory conditions serving to control locally the said supervisory device of the connected end of the last said cord circuit, means causing the said talking-conductor supervisory conditions on the calling end of a cord circuit used to extend a calling trunk to impose corresponding supervisory conditions on such trunk by way of a talking conductor of the cord circuit, means in any cord circuit for disassociating the calling supervisory device from the calling sleeve conductor and operatively associating it with the answering sleeve conductor, along with the answering supervisory device, and means for rendering the transfer means operative dependent upon the cord circuit being connected between two trunks.

2. In a system according to claim 1, each said lines and trunk being connected to its switchboard termination by way of coupling apparatus which divides it into two inductively coupled sections, the said supervisory-control means associated with the trunks including trunk-relay apparatus for each trunk for relaying signals between the outside and switchboard sections of the trunk, means included in the trunk-relay apparatus for any trunk equipped for outward service for placing a forward in-use condition on the outside section of the trunk according to the flow of current over the local sleeve conductor of the trunk, and for imposing alternative supervisory conditions separately on the local sleeve conductor of the trunk and on a talking conductor of the switchboard section of the trunk according to whether the trunk is in an in-use distant-end condition or in a non-use distant-end condition, and means included in the trunk-relay apparatus of any trunk equipped for inward service for imposing alternative supervisory signal conditions on the local sleeve conductor of the trunk, and for imposing alternative in-use and non-use conditions on the local end of the outside section of the trunk under the joint control of the sleeve conductor and a talking conductor of the switchboard section of the trunk.

3. In a system according to claim 2, wherein the switchboard section of any line or trunk terminating at a said operator-controlled exchange includes a pair of talking conductors, and each end of any said cord circuit has a pair of talking conductors for connection to the respectively corresponding ones of the said talking conductors of either a line or a trunk by the said switching apparatus, a pair of local talking conductors within each said cord circuit joining the talking conductors at one end with the respectively non-corresponding ones at the other end of the cord circuit, with one local talking conductor being direct-current and voice-current continuous while the other one is voice-current continuous but direct-current discontinuous, the said trunk relay apparatus equipped for outward service for imposing alternative supervisory conditions on the said direct-current and voice-current continuous conductor, and the said trunk relay apparatus equipped for inward service including a supervisory relay associated with the switchboard section of the trunk for imposing alternate in-use and non-use condition on the said local end of the outside section of the trunk responsive to supervisory conditions over the direct-current and voice-current continuous conductor.

4. In a multi-exchange telephone system according to claim 1, the said means for disassociating the calling supervisory device from the calling sleeve conductor and operatively associating it with the answering sleeve conductor including two relays associated respectively with such sleeve conductors, means rendering each such relay selectively operable over its associated sleeve conductor, and means for rendering the said means for transferring the calling supervisory device from one said sleeve conductor to the other dependent upon both of the last said relays having been operated.

5. In a multi-exchange telephone system according to claim 4, wherein the said means for transferring the calling supervisory device includes means for connecting it in parallel with the said answering supervisory device.

6. In a cord circuit having an answering end and a calling end, each such end including at least one talking conductor and a sleeve conductor, an answering and a calling supervisory device associated with their respectively corresponding ends of the cord circuit, each supervisory device being normally controlled over its associated sleeve conductor, and relay means selectively operable over the sleeve conductors for disassociating the calling supervisory device from the calling sleeve conductor and operatively associating it with the answering sleeve conductor along with the answering supervisory device, whereby both supervisory devices then act in unison in response to supervisory control over the answering sleeve conductor.

7. In a cord circuit according to claim 6, the said relay means including an answering relay selectively controlled over the answering end of the cord circuit, and a calling relay selectively controlled over the calling end of the cord circuit under the further control of contact means controlled by the answering relay.

8. In a cord circuit according to claim 7, the said calling relay including contact means for effecting the said transfer of the calling supervisory device from one said sleeve conductor to the other.

References Cited in the file of this patent

UNITED STATES PATENTS

| | | |
|---|---|---|
| 2,631,195 | Ostline | Mar. 10, 1953 |
| 2,744,965 | Molnar | May 8, 1956 |